United States Patent [19]
Humber

[11] Patent Number: 6,073,891
[45] Date of Patent: Jun. 13, 2000

[54] SNAP LOCK PIPE MOUNTING CLAMP

[75] Inventor: Jeffrey A. Humber, Memphis, Tenn.

[73] Assignee: IPS Corporation, Collierville, Tenn.

[21] Appl. No.: 09/004,976

[22] Filed: Jan. 12, 1998

[51] Int. Cl.[7] .............................. A47B 96/06; F16M 13/00
[52] U.S. Cl. ........................ 248/74.5; 248/547; 248/217.2
[58] Field of Search ................................ 248/547, 60, 62, 248/67.5, 67.7, 74.1, 74.2, 74.5, 71, 207, 220.1, 216.1, 217.2

[56] References Cited

U.S. PATENT DOCUMENTS

| | | | |
|---|---|---|---|
| 1,163,132 | 12/1915 | Ette .......................................... | 248/547 |
| 2,288,439 | 6/1942 | Dahm ................................... | 248/217.2 |
| 2,901,200 | 8/1959 | Voeks .................................... | 248/74.8 |
| 2,940,712 | 6/1960 | Lloyd-Young ........................ | 248/217.2 |
| 3,241,797 | 3/1966 | Anderson ................................... | 248/71 |
| 4,442,994 | 4/1984 | Logsdon .................................. | 248/547 |
| 4,533,102 | 8/1985 | Ferrell ..................................... | 248/74.1 |
| 4,582,288 | 4/1986 | Ruehl ...................................... | 248/547 |
| 4,588,152 | 5/1986 | Ruehl et al. ............................... | 248/71 |
| 4,903,920 | 2/1990 | Merritt ...................................... | 248/71 |
| 4,903,921 | 2/1990 | Logsdon .................................. | 248/74.5 |
| 4,911,396 | 3/1990 | Polonsky ............................... | 248/217.2 |
| 5,350,267 | 9/1994 | Mangone, Jr. ........................... | 411/442 |
| 5,411,228 | 5/1995 | Morawa et al. ......................... | 248/74.5 |
| 5,482,234 | 1/1996 | Lyon ...................................... | 248/74.5 |
| 5,739,474 | 4/1998 | Bradley .................................... | 174/135 |

FOREIGN PATENT DOCUMENTS

| | | | |
|---|---|---|---|
| 1312586 | 11/1962 | France .................................. | 248/74.4 |
| 95706 | 12/1939 | Sweden .............................. | 248/217.2 |
| 2 099 905 | 12/1982 | United Kingdom .................. | 248/74.1 |
| WO94/18492 | 8/1994 | WIPO .................................... | 248/547 |

*Primary Examiner*—Derek J. Berger
*Assistant Examiner*—Michael D. Nornberg
*Attorney, Agent, or Firm*—Samuels, Gauthier & Stevens

[57] ABSTRACT

A pipe mounting clamp comprises a generally C-shaped piece of plastic or other resilient material which is sufficiently flexible to allow a pipe to be snapped into a central pipe receiving cavity thereof while firmly retaining the same. The C-shaped member has a pair or orthogonal bores for receiving nails, screws or other fasteners which attach the C-shaped member to a stud or joist. The bores are positioned to permit the C-shaped member to be attached to a stud or joist in the appropriate orientation best suited for receiving and retaining the pipe. The bores may be formed of a plurality of offset slots that open onto opposite sides of the C-shaped member to allow the clamp to be injection molded without mold parts that move. The central pipe receiving cavity may be formed with a plurality of radially inwardly directed pipe engaging ribs.

8 Claims, 5 Drawing Sheets

SNAP LOCK PIPE MOUNTING CLAMP

CROSS-REFERENCE TO INVENTION DISCLOSURE DOCUMENT

Reference is made to invention Disclosure Document No. 412,199 filed in the U.S. Patent and Trademark Office on Jan. 27, 1997 entitled SNAP LOCK PIPE MOUNTING CLAMP.

BACKGROUND OF THE INVENTION

The present invention relates to plumbing, and more particularly, to fixtures utilized to mount pipes to stud walls and joists.

Over the years, many brackets, clamps, fixtures, straps and similar devices have been developed for securing water pipes to wooden studs and joists as well as sheet metal studs. Depending upon the plumbing codes applicable to a particular jurisdiction, the water pipes must be secured at minimum intervals. In addition, it is desirable that any device utilized to secure water pipe to studs or joists be easy to install, and allow rapid attachment to the pipe, without risk of crimping, bending or puncturing the same. Also, any fixture or device utilized to mount water pipe in residential construction should also be inexpensive. It should reduce noise produced by water hammer in thermal expansion and contraction of the water pipe, particularly where Copper water pipe is utilized. Also, any fixture utilized to mount water pipe must not generate any galvanic action that would corrode Copper water pipe.

SUMMARY OF THE INVENTION

It is the primary object of the present invention to provide a pipe mounting clamp that can be utilized to secure pipe to studs and joists.

It is another object of the present invention to provide a pipe mounting clamp that can be secured to a stud or joist and permit a pipe to be releasably inserted into the same and held in a secure fashion.

It is still a further object of the present invention to provide a snap lock pipe mounting clamp which is inexpensive to manufacture and easy to install.

In accordance with the present invention, a pipe mounting clamp comprises a generally C-shaped piece of plastic or other resilient material which is sufficiently flexible to allow a pipe to be snapped into a central pipe receiving cavity thereof while firmly retaining the same. The C-shaped member has a pair or orthogonal bores for receiving nails, screws or other fasteners which attach the C-shaped member to a stud or joist. The bores are positioned to permit the C-shaped member to be attached to a stud or joist in the appropriate orientation best suited for receiving and retaining the pipe.

DETAILED DESCRIPTION OF THE PREFERRED EMBODIMENTS

Figure 1:
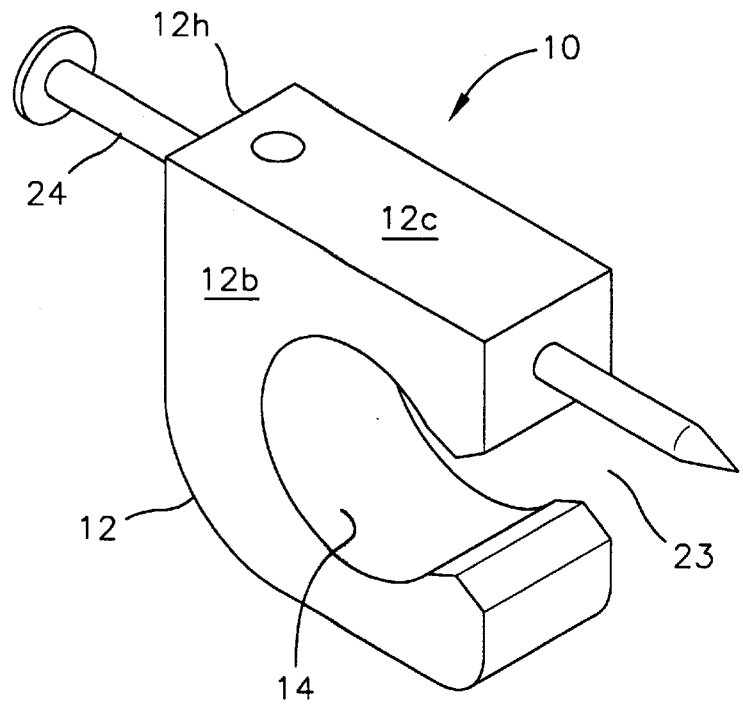
FIG. 1 is a perspective view of a first embodiment of the snap lock pipe mounting clamp of the present invention with a nail through one of its bores.
Figure 4:
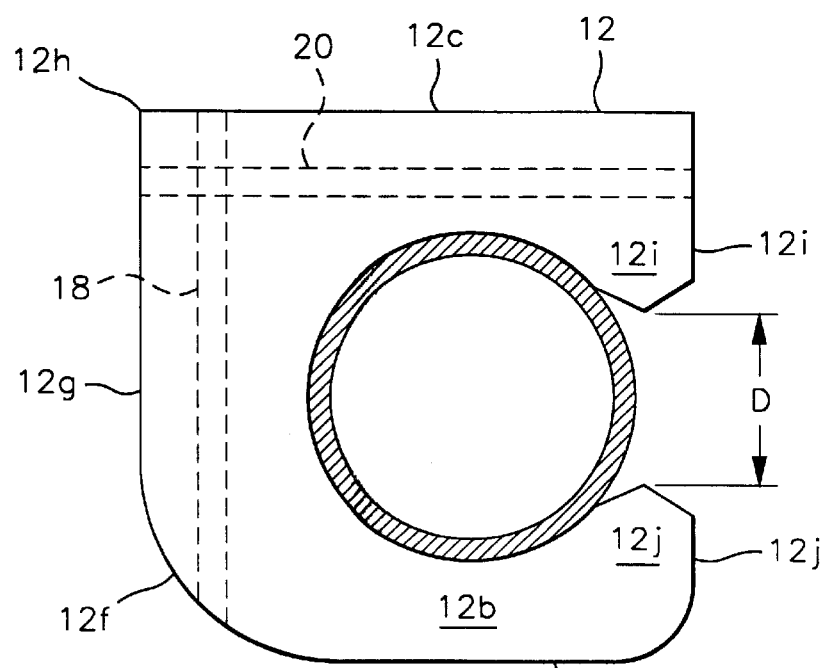
FIG. 4 is an enlarged side elevation view of the pipe mounting clamp of FIG. 1 showing its two bores in phantom lines, and showing a pipe in section snapped into the pipe receiving cavity of the clamp.
Figure 2:
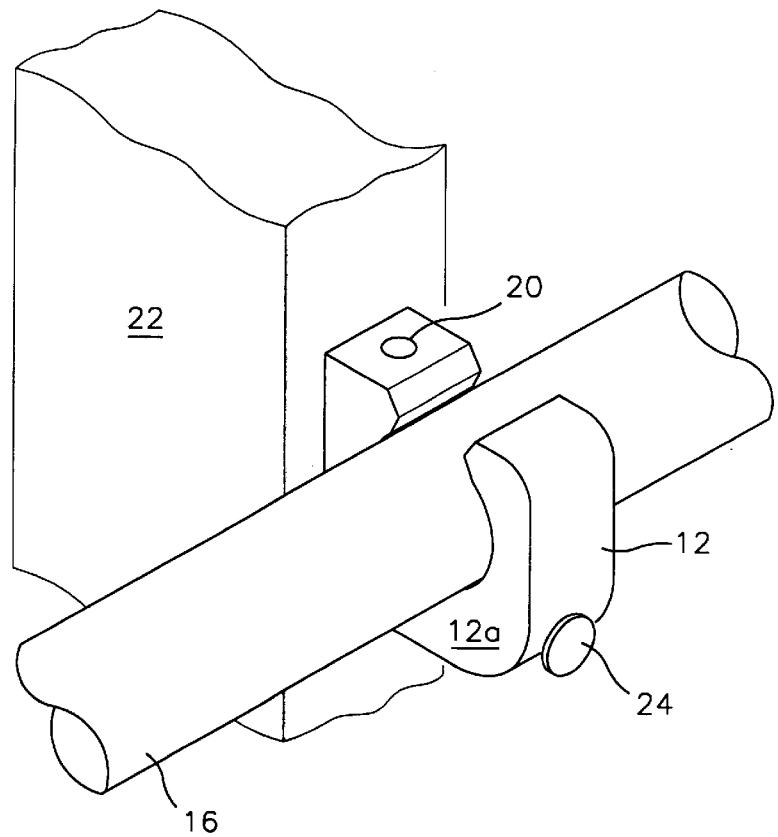
FIG. 2 is a perspective view showing the pipe mounting clamp of FIG. 1 secured to a stud with a nail and a pipe held therein in a first configuration.
Figure 3:
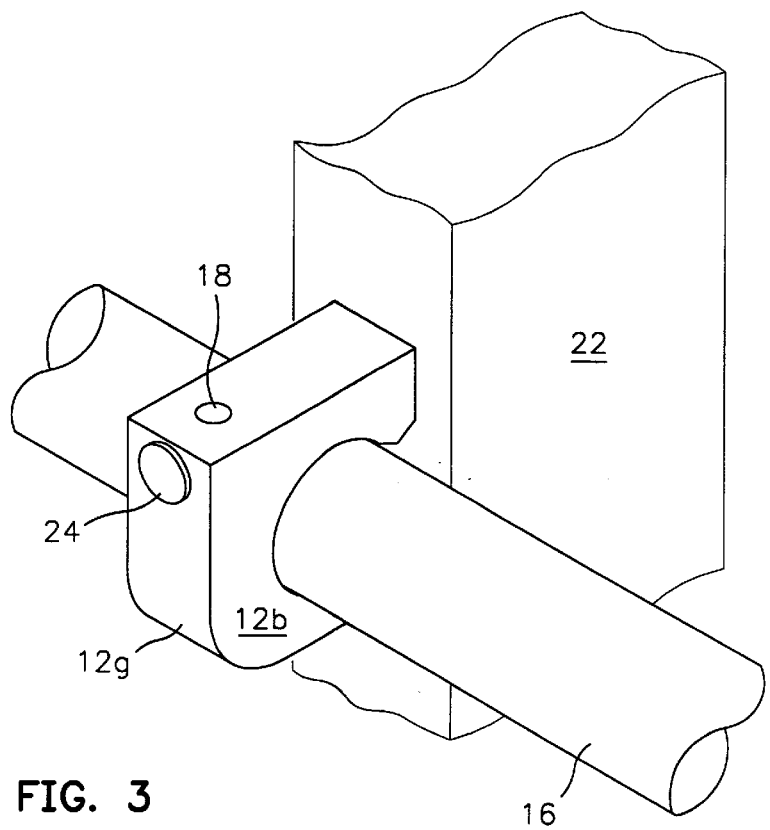
FIG. 3 is a view similar to FIG. 2 showing the first embodiment of my pipe mounting clamp secured to the stud for holding the pipe in a second configuration.

Referring to FIG. 1, a first embodiment 10 of my snap lock pipe mounting clamp is illustrated which is comprised of substantially C-shaped member 12. The C-shaped member 12 may be formed of plastic or other resilient material which permits it to deflect and resume its original shape. Suitable plastics include polyethylene, polypropylene, polystyrene, PVC and CPVC. The C-shaped member 12 has parallel flat opposing side surfaces 12a and 12b (FIGS. 2 and 3). The C-shaped member 12 further has a first planar surface 12c (FIG. 1) and an opposing second planar surface 12d (FIG. 4). The planar surface 12d joins with rounded edges 12e and 12f. The rounded edge 12f communicates with a third planar surface 12g (FIGS. 3 and 4). The planar surface 12c and 12g join in a sharp corner edge 12h (FIGS. 1 and 4).

The C-shaped member 12 defines a pipe receiving cavity in the form of a central hole 14 (FIG. 1) for receiving a water pipe 16 (FIGS. 2–4) therein. The hole 14 has a diameter slightly smaller than the outside diameter of the pipe 16. The outer legs 12i and 12j (FIG. 4) of the C-shaped member 12 define V-shaped shoulders which can deflect apart sufficiently to allow the pipe 16 to snap into the hole 14. Preferably the distance D between the shoulders is less than seventh-five percent of the outside diameter of the pipe 16, and more preferably, less than sixty-six percent of the outside diameter of the pipe 16. The distance D will depend upon the resilience of the plastic material from which the C-shaped member is formed. However, it is important that the distance D be at least less than the outside diameter of the pipe 16 in order that the pipe can be snapped into place, and not inadvertently removed or withdrawn from the clamp 10.

A pair of orthogonal relatively small diameter bores 18 and 20 (FIG. 4) extend through the C-shaped member parallel to the edges 12g and 12c, respectively. These bores can receive nails, screws, or other fasteners for securing the clamp 10 to a structural member such as a vertical wooden stud 22 (FIGS. 2 and 3). As seen in these two figures, the orthogonal placement of the bores 18 and 20 permits the clamp 10 to be secured to the stud 22 in various configurations. In the configuration shown in FIG. 2, the outwardly opening gap 23 (FIG. 1) in the hole 14 is positioned upwardly and a nail 24 (FIG. 2) has been inserted through the bore 18 to secure the edge 12c of the C-shaped member 12 against the outside edge of the stud 22. In the configuration shown in FIG. 3, the nail 24 has been installed through the bore 20. The outside edge 12g of the C-shaped member 12 faces outwardly and the flat outwardly facing surfaces of the shoulder 12i and 12j (FIG. 4) directly abut the outside edge of the stud 22. It will be noted that in either configuration, the pipe 16 is spaced from the stud 22 to prevent the pipe from engaging the stud. This reduces or eliminates noise otherwise present in prior art pipe clamps wherein the pipe is held directly against a structural member.

Figure 11:
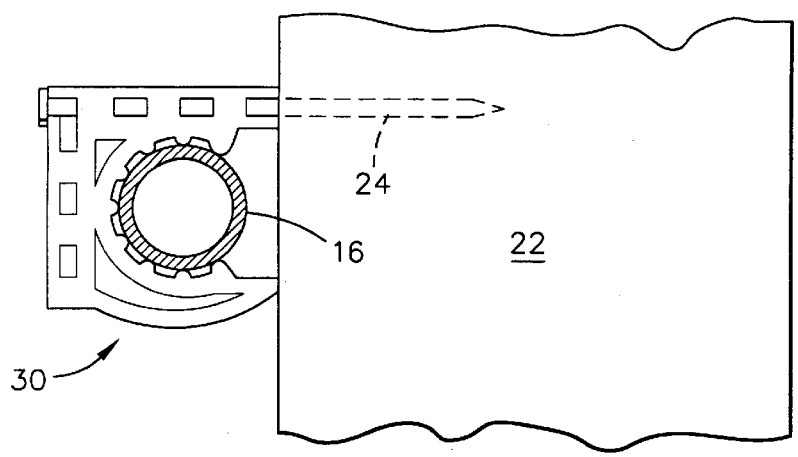
FIGS. 11–13 illustrate various orientations in which the second embodiment of my pipe mounting clamp may be used to secure a pipe to a wall stud.
Figure 12:
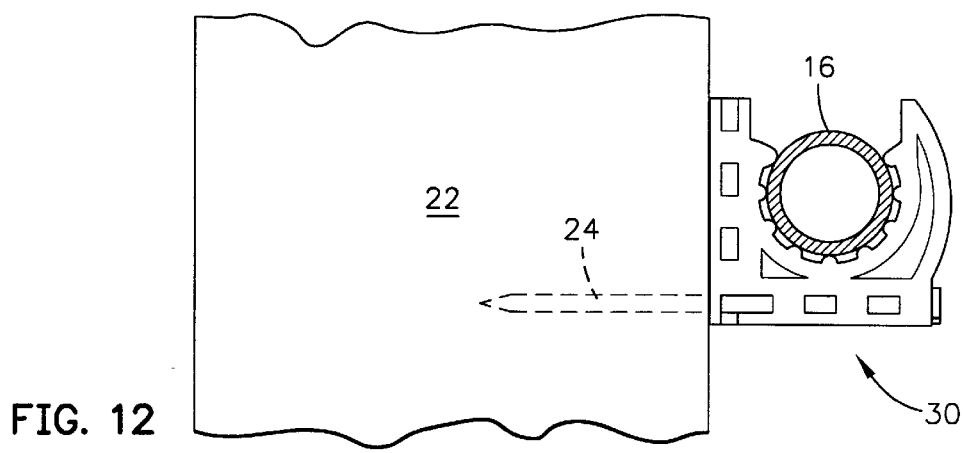
Figure 13:
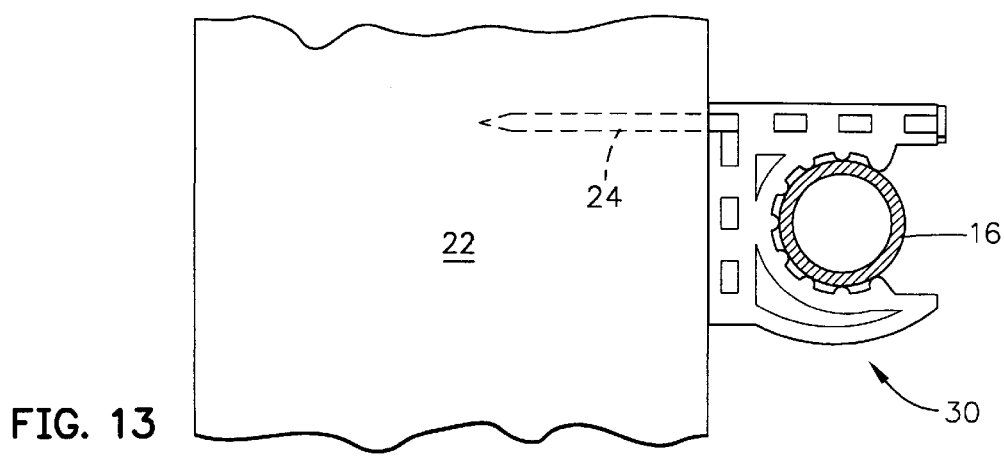

FIGS. 5–10 illustrate a second embodiment 30 of my pipe mounting clamp. It is comprised of a substantially C-shaped member 32 that is injection molded from a suitable plastic material such as polyethylene, polypropylene, polystyrene, PVC or CPVC. The second embodiment 30 differs from the first embodiment 10 in that the former has a waffle type configuration along its to side edges that define a pair of orthogonal bores 34 and 36 (FIGS. 9 and 10) for receiving the nail 24. In addition, the C-shaped member 32 of the second embodiment is formed with a plurality of radially inwardly directed ribs 38 of a first dimension and an outer pair of radially inwardly directed ribs 40 of a second larger dimension along the periphery of the inner generally circular edge of the C-shaped member 32. As best seen in FIGS. 11–13 the ribs 38 and 40 engage and grip the outer surface of the pipe 16. The inner ribs 38 and the outer ribs 40 surround more than one hundred and eighty degrees of the circumference of the pipe 16. The tips of the outer ribs 40 are spaced apart such that the C-shaped member 32 must be spread apart to receive the pipe 16 and will thereafter spring back together to grip the pipe 16. The outer ribs 40 are configured and dimensioned to prevent the pipe 16 from being removed from the C-shaped member without significant force required to spread them apart so that the apices of the ribs 40 will be further apart than the outer diameter of the pipe 16.

Figure 5:
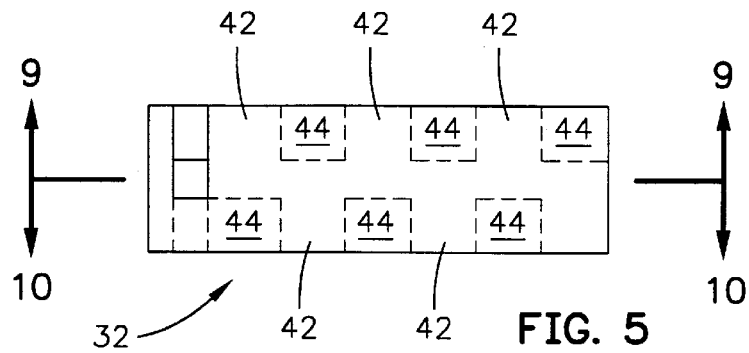
FIG. 5 is an elevation view of the top edge of a second embodiment of my pipe mounting clamp.
Figure 6:
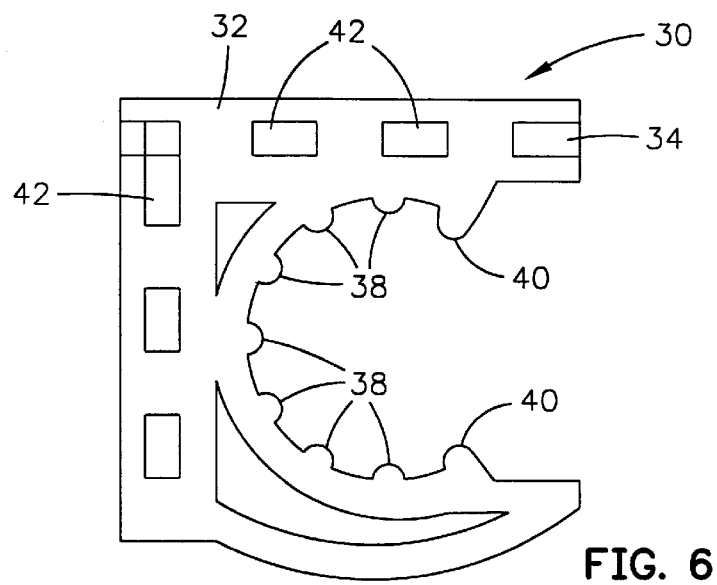
FIG. 6 is a side elevation view of the second embodiment of my pipe mounting clamp.
Figure 7:
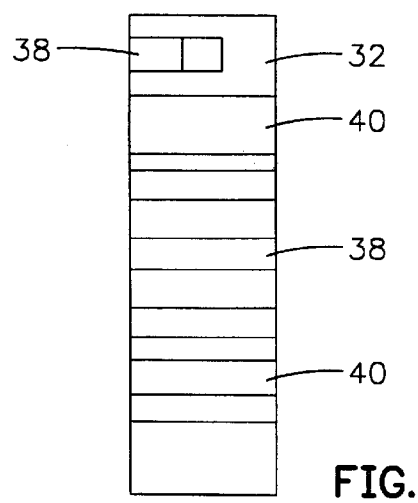
FIG. 7 is a side elevation view of the second embodiment of my pipe mounting clamp taken from the right side of FIG. 6.
Figure 8:
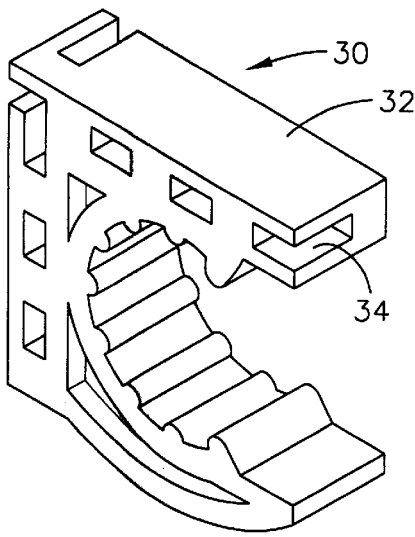
FIG. 8 is an isometric view of the second embodiment of my pipe mounting clamp.
Figure 9:
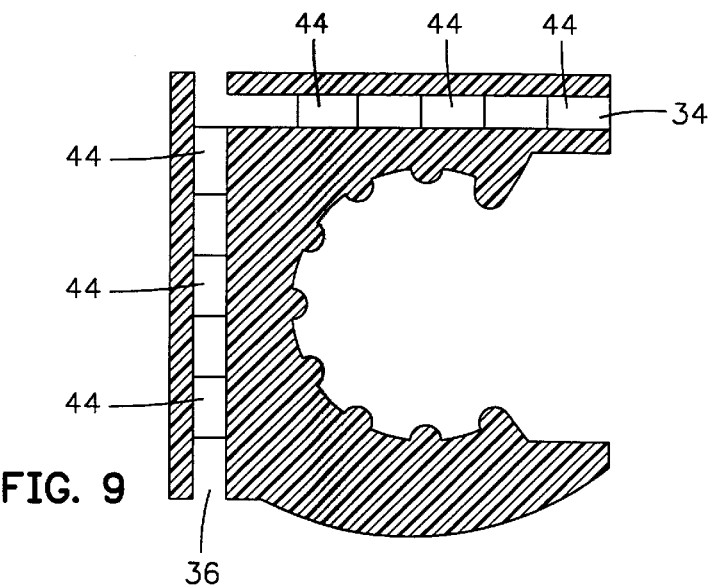
FIG. 9 is a vertical sectional view of the second embodiment of my pipe mounting clamp taken along lines 9—9 of FIG. 5.
Figure 10:
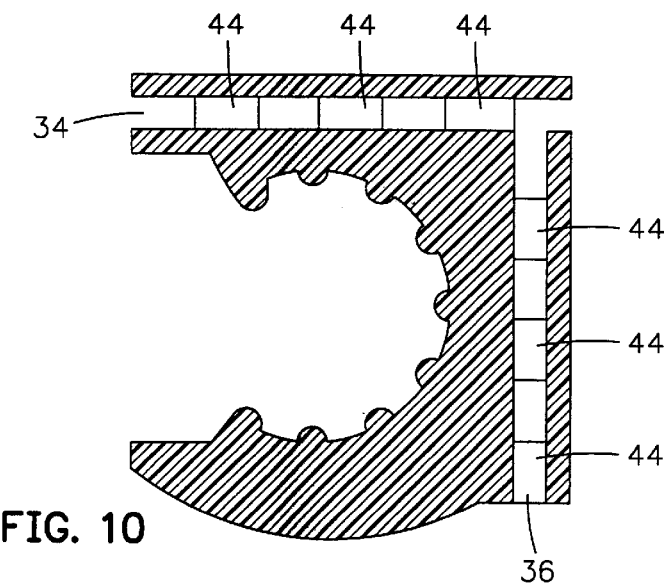
FIG. 10 is a vertical sectional view of the second embodiment of my pipe mounting clamp taken along lines 10—10 of FIG. 5.

As previously noted the waffle type configuration along the straight side edges of the C-shaped member 32 defines the orthogonal bores 34 and 36 (FIGS. 9 and 10). Either one of these bores 34 or 36 may have the nail 24 inserted therethrough. The nail 24 is used to attach or secure the second embodiment 30 to a wooden wall stud 22 in various configurations as illustrated in FIGS. 11–13. In order to avoid expensive injection molds that have moveable parts such as sliding pins to define the nail-receiving bores 34 and 36, the straight edged portions of the C-shaped member 32 are formed with a plurality of offset rectangular slots 42 (FIGS. 5 and 6) on opposite sides thereof that define the bores 34 and 36. The slots 42 define rectangular posts 44 best seen in FIGS. 5, 9 and 10. As best seen in FIG. 5, the slots 42 on one side of the C-shaped member are offset from the slots 42 on the opposite side of the C-shaped member 42. By molding the C-shaped member with this configuration expensive tooling that would mold the bores 34 and 36 in place by having moving mold parts is avoided. The cost of drilling or otherwise machining a solid C-shaped member to provide the bores is also avioded. The waffle configuration also saves on the amount of plastic used in each clamp. In addition, the use of the waffle configuration reduces the friction to insertion of the nail 24 into the bores that would otherwise exist if the bores were completely smooth as in the case of bores 18 and 20 (FIG. 1) of the first embodiment. The waffle construciton of the C-shaped member 32 also allows a greater range of sizes of nail 24 to be inserted into the bores 34 and 36 compared to completely smooth bores with no slots.

While I have described two embodiments of my snap lock pipe mounting clamp, it will be understood by those skilled in the art that my invention may be modified in both arrangement and detail. Therefore, the protection afforded my invention should only be limited in accordance with the following claims.

I claim:

1. A snap lock pipe mounting clamp, comprising:
   a generally C-shaped member having a hole therein accessible through a gap on a side of the C-shaped member, the hole adapted to have a diameter slightly less than the outside diameter of a pipe to be received by the C-shaped member, the C-shaped member being made of a resilient, flexible material so that a pair of outer legs of the C-shaped member can deflect outwardly for receiving the pipe into the hole and will thereafter return to their original positions for holding the pipe in place, the C-shaped member being formed with a pair of opposing bores which extend therethrough in orthogonal relationship for receiving a fastener therethrough to secure the C-shaped member to a structural member in different configurations.

2. The clamp according to claim 1 wherein the C-shaped member is made of plastic.

3. The clamp according to claim 1 wherein the C-shaped member includes a pair of opposing shoulders which define the gap therebetween.

4. The clamp according to claim 3 wherein the distance between the opposing shoulders of the C-shaped member is adapted to be configurated to be less than about seventy-five percent of the outside diameter of the pipe.

5. The pipe clamp according to claim 3 wherein a distance between the opposing shoulders of the C-shaped member is adapted to be configured to be less than about two-thirds the outside diameter of the pipe.

6. A snap lock pipe mounting clamp, comprising:
   a generally C-shaped member having a hole therein accessible through a gap on a side of the C-shaped member, the hole adapted to have a diameter slightly less than the outside diameter of a pipe to be received by the C-shaped member, and the C-shaped member being made of a resilient, flexible injection molded plastic so that a pair of outer legs of the C-shaped member can deflect outwardly for receiving the pipe into the hole and will thereafter return to their original positions for holding the pipe in place, the C-shaped member being formed with a pair of opposing bores which extend therethrough in orthogonal relationship for receiving a fastener therethrough to secure the C-shaped member to a structural member in different configurations, each of these bores being defined by a plurality of offset slots that open on opposite sides of the C-shaped member.

7. The clamp according to claim 6 wherein C-shaped member is formed with a plurality of ribs that extend radially inwardly from a permimeter of the hole.

8. A snap lock pipe mounting clamp, comprising:
   a generally C-shaped member having a hole therein accessible through a gap on a side of the C-shaped member, said side being adapted to engage a mounting structure in a first mounting configuration, said C-shaped member having another side which is adapted to engage a mounting structure in a second mounting configuration, and a pair of bores extending through said C-shaped member in orthogonal relationship and exiting through respective ones of said sides for receiving a fastener that mounts said clamp to a structural member in different configurations.

* * * * *